United States Patent [19]

Parfitt

[11] 4,266,637

[45] May 12, 1981

[54] NON-RETURN DEVICE

[75] Inventor: Norman L. C. Parfitt, Ashby-de-la-Zouch, England

[73] Assignee: Coal Industry (Patents) Limited, London, England

[21] Appl. No.: 86,306

[22] Filed: Oct. 19, 1979

Related U.S. Application Data

[63] Continuation of Ser. No. 873,718, Jan. 30, 1978, abandoned.

[30] Foreign Application Priority Data

Jan. 28, 1977 [GB] United Kingdom ............... 03631/77

[51] Int. Cl.³ .............................................. F16D 65/54
[52] U.S. Cl. ......................... 188/196 P; 188/79.5 GT; 192/111 A
[58] Field of Search ................. 188/67, 71.8, 79.5 GT, 188/79.5 M, 196 R, 196 P, 198, 199; 74/162; 92/15, 19; 192/41 R, 111 A

[56] References Cited

U.S. PATENT DOCUMENTS

| 410,079 | 8/1889 | Eames | 188/199 |
|---|---|---|---|
| 2,599,079 | 6/1952 | Tatom | 188/67 |
| 2,619,198 | 11/1952 | Freund | 188/196 P |
| 3,048,980 | 8/1962 | Cousino et al. | 60/594 |
| 3,091,310 | 5/1963 | Smith et al. | 188/196 P |
| 3,458,022 | 7/1969 | Reiff | 188/196 P |

FOREIGN PATENT DOCUMENTS

| 1286848 | 1/1969 | Fed. Rep. of Germany | 188/196 P |
| 2160278 | 6/1973 | Fed. Rep. of Germany | 192/111 A |
| 319120 | 3/1957 | Switzerland | 188/79.5 GT |
| 627537 | 8/1949 | United Kingdom . | |
| 1342002 | 12/1973 | United Kingdom . | |
| 1418766 | 12/1975 | United Kingdom . | |

Primary Examiner—Edward R. Kazenske
Attorney, Agent, or Firm—Stevens, Davis, Miller & Mosher

[57] ABSTRACT

The invention provides a simple robust non-return device. The essential features of the device are a housing having in it a stepped bore, and a rod. The bore conveniently has an asymmetric step. The rod fits into the narrower part of the bore. As the housing and rod are relatively pivoted in one direction the rod becomes jammed in the narrower part of the bore and so cannot move. If the housing and the rod are relatively pivoted in the opposite direction the rod is able to slide freely in the bore. Therefore the rod can only move relative to the housing in one direction.

6 Claims, 3 Drawing Figures

NON-RETURN DEVICE

This is a continuation of application Ser. No. 873,718 filed Jan. 30, 1978, now abandoned.

This invention relates to non-return devices which permit relative movement between an element and the non-return device only in one direction of travel. In particular, but not exclusively, the invention relates to such non-return devices constituting parts of self-adjusting brakes for wheeled vehicles.

Many non-return devices are known at present and are in extensive use both in brake systems and in many other devices, for instance self-adjusting clutch systems. However all the presently used non-return devices have various disadvantages. For instance, many of them cannot easily be reset. A number of them comprise many parts, any one of which may be easily broken. In the devices with many parts, some parts move within the device which makes the device prone to failure due to jamming of one of the moving parts. It is therefore usually necessary to ensure that these non-return devices are carefully maintained. In many cases, resetting or repairing of the devices must be carried out by skilled workers, often in a workshop, and not on site, which would be more desirable. This may be a great disadvantage if the devices are installed on machines fixed at a remote location.

It is therefore an object of the present invention to provide a non-return device which substantially overcomes these disadvantages.

A non-return device according to the present invention comprises a housing which defines a bore having a first section and a second section, the second section having a cross-sectional area larger than that of the first section, and a rod adapted to be received within the bore, the rod having a cross-sectional shape the same as, but a cross-sectional area marginally smaller than, that of the first section of the bore, the device being arranged such that, in use, relative pivotal movement between the rod and the housing in one direction causes the rod to jam in the first section of the bore, and relative pivotal movement in the opposite direction enables the rod to move freely within the bore, whereby relative movement between the rod and housing is restricted to one direction only.

Conveniently the housing is pivotally mounted on a first member and the rod is connected, optionally through a lost motion means, to a second member, the first and second members being relatively movable. Preferably the housing is mounted such that the pivot is above the bore and is assymmetrically disposed with respect to the length of the bore, such that the effect of gravity assists the relative pivotal motion which causes the jamming of the rod.

Conveniently the bore has on one side a wall which extends the whole length of the bore and on the opposite side a wall which is interrupted by a step, the position of the step defining the boundary between the two sections of the bore.

Alternatively the bore may be stepped around its perimeter at a convenient distance from one end of the bore. In this case the step is conveniently asymmetric so that the step is larger on one side of the bore than on the other. However in the case where the pivot is above the bore, the step may be symmetric.

The bore may have any convenient cross-sectional shape and is preferably of circular or square cross-section.

In use, a non-return device with an asymmetric step works in the following manner. As the rod and housing are relatively pivoted in one direction the rod will abut either the continuous wall or the wall of the smaller-stepped side of the bore. In this position the rod is not jammed in the first section and is free to move relative to the housing by sliding along the wall which it is abutting. If relative pivotal movement occurs in the opposite direction the rod moves towards the discontinuous or larger—stepped wall of the bore. However before it reaches this wall the rod comes into frictional contact with the edges of the first (narrower) section of the bore. This frictional contact gives rise to a jamming action which prevents relative movement between the rod and the housing.

In the case of a symmetrically stepped bore with the pivotal mounting above the bore, the device works as follows. As the rod is moved relatively away from the housing the rod abuts the housing and causes it to pivot against the action of gravity, causing the rod to lie flush with the upper surface of the first (narrower) section of the bore, thus enabling it to slide therealong. When the rod and housing are moved relatively together, the rod abuts the housing, causing it to pivot in the direction of the action of gravity. This causes the rod to come into frictional contact with the edges of the first section of the bore, again giving rise to the jamming action.

In a preferred arrangement, wherein the housing is pivotally attached to a first member with the pivotal axis located away from and above the discontinuous or larger-stepped wall of the bore, and the rod is fixed to a second member, the action of the device prevents movement of the first member towards the second member.

The rod and housing may be independently made of any material, for instance mild or bright key steel. It is preferable that the edges of the bore with which the rod comes into frictional contact, and the rod, should be made of relatively hard material such as bright key steel. The material should be neither brittle nor easily bendable. Conveniently the rod, and housing are made of the same material.

The bore may be sealed at the end of the second section remote from the first section and filled with grease. The grease both assists the sliding of the rod within the bore and also acts as a preservative for the material. It does not have any adverse affect on the jamming action which prevents the relative movement of the rod and housing.

The bore may conveniently be made by drilling a first hole through a block of material and then drilling a second hole of larger diameter than that of the first hole into, but not totally through, the block, the axes of the holes being parallel but offset. This gives a bore having a cylindrical first section and a figure-of-eight shaped second section. The bore may be sealed at the end remote from the first section by letting a circular step into the block and fitting a Welsh Plug into the step.

In an alternative method, the bore is made by drilling a first well into a block of material and then drilling a second concentric well of larger diameter but much shorter length into the block. A hardened cylindrical ring having an external diameter equal to the diameter of the second well and an internal diameter smaller than the diameter of the first well is fitted into the second well, thus forming a step in the bore.

The length of the first section of the bore must be related to the perpendicular distance between the pivotal axis about which the housing moves relative to the rod and the longitudinal axis of the first section of the bore. The ratio of the length to the perpendicular distance must be equal to or less than the co-efficient of friction between the materials from which the rod and housing are made. For most metal on metal arrangements the co-efficient of friction is in the range from 0.15 to 0.25, although for steel on steel arrangements it may be up to 0.3. If the ratio is greater than the co-efficient of friction no jamming of the rod in the housing will occur.

The housing may be pivotally attached to, for instance, a brake shoe, in which case the rod may be attached, through a lost motion means, to a machine to be braked. It is possible in this way to provide a self-adjusting brake giving a set clearance of the brake pad from the wheel to be braked.

The device may be reset or adjusted by forcing relative pivotal movement of the rod and housing in the direction in which the rod becomes free to move relative to the housing. The rod may then be moved within the housing and the length of the rod outside the housing may be thereby altered.

The device according to the invention is robust, comprises only two relatively movable parts which are in contact, and can be easily reset. Thus the device at least partly overcomes all the disadvantages of the previously used devices.

By way of example only, two embodiments of a non-return device according to the invention are described below with reference to the accompanying drawings, in which.

Figure 1:
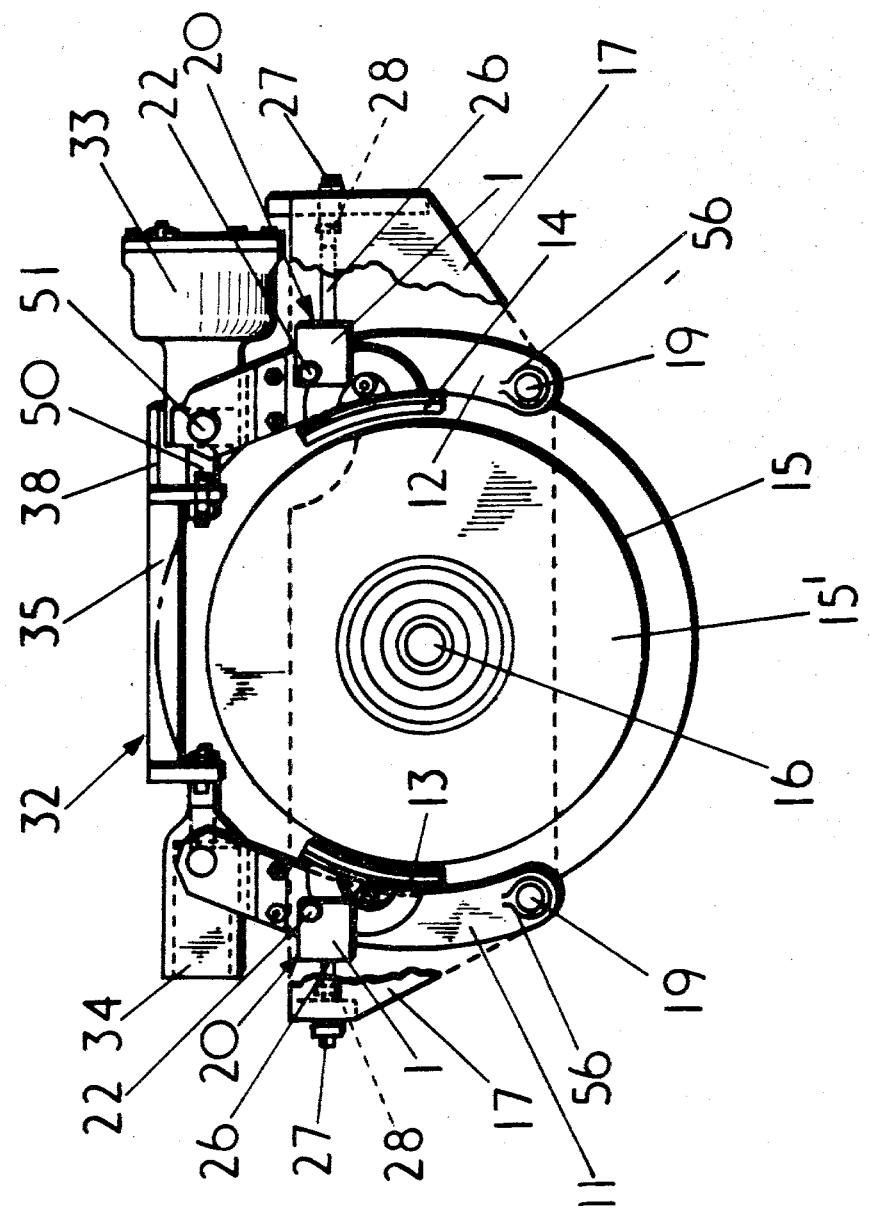
FIG. 1 shows a side view of a braking system associated with a vehicle wheel, the braking device including two identical non-return devices according to either of the embodiments of the invention.

Referring now to FIG. 1, the braking system comprises two brake shoe assemblies 11 and 12 having brake pads 13 and 14 respectively arranged to abut the rim 15 of a vehicle wheel 15'. The wheel 15' is mounted on an axle 16 carried on the vehicle chassis (not shown), and the shoe assemblies 11 and 12 are pivotally attached to a mounting plate 17 which is fixedly secured to the vehicle chassis. The shoe assemblies 11 and 12 are attached to the plate 17 by pins 19 which are located in bushes (not shown) on the plate 17. The shoe assemblies 11 and 12 are held in place by circlips 56.

Means 20 associated with each shoe assembly are provided for allowing pivotal movement of the shoe assemblies in the direction of brake application where the pads 13 and 14 are in contact with the rim 15 of the wheel 15', but restricting the pivotal movement of the shoe assemblies in the direction of brake release to a preselected amount. Each of the means 20 includes a non-return device, according to either embodiment of the invention as described below, comprising a housing 1 pivotally connected with the associated shoe assembly by a bolt 22.

Figure 2:
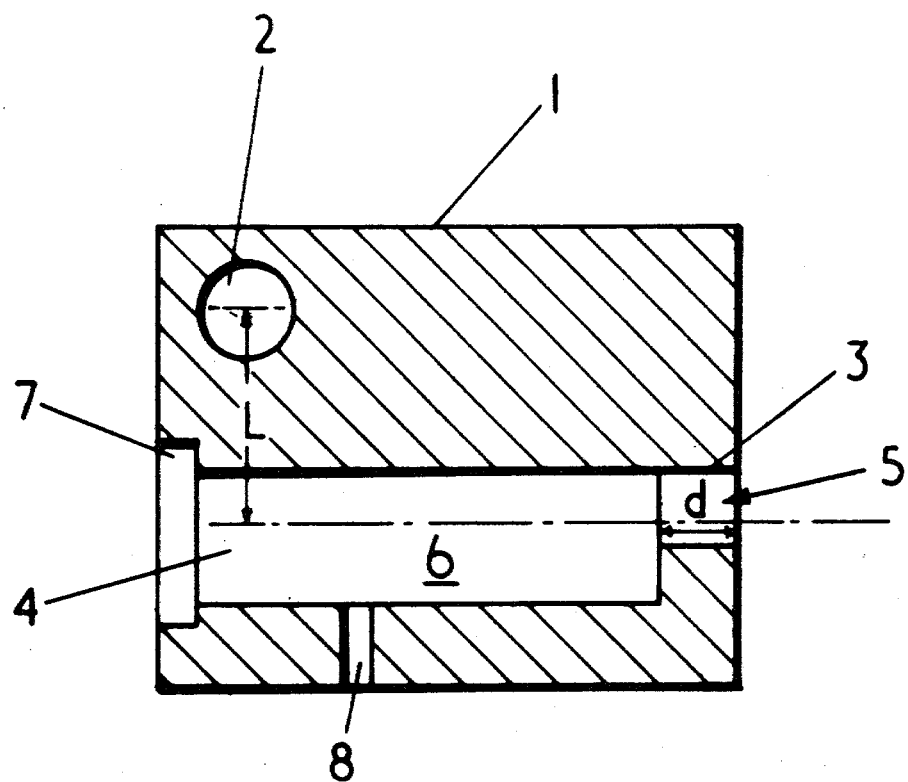
FIG. 2 shows a side sectional view of one arrangement of a detail of FIG. 1.

One embodiment of the housing 1 is shown in detail in FIG. 2, to which reference is now also made. The housing 1 is made from a rectangular block of bright key steel in the following manner, using a suitable machine tool. A cylindrical hole 2 is made with its axis parallel to the shortest dimension of the block in one corner thereof. A second cylindrical hole 3 is made in the lower half of the block, as viewed in FIG. 2, with the axis parallel to the longest dimension thereof. A cylindrical well 4 having a diameter greater than the diameter of the second hole 3, is made in the block. The well 4 has its axis parallel to the axis of the second hole 3 and offset vertically as shown in FIG. 2 away from the first hole 2, and has its tangential plane parallel to the axis of the first hole 2 common with the similar plane of the second hole 3. The housing 1 is thus provided with a bore having a first portion 5 and a second portion 6. The bore is sealed at its larger end by making a stepped rim 7 about the open end of well 4 and fixing a Welsh Plug (not shown) in the stepped rim 7. A drilling 8 having a smaller diameter than that of the second hole 3 in let into the bore. The bore is filled with grease which, in use, may be forced into or out of the bore through the drilling 8. The first portion 5 has a length d, and the perpendicular distance between the axis of the first hole 2 and the axis of the second hole 3 is L. In this embodiment the ratio of the length d to the distance L is 0.18, which is less than the co-efficient of friction of steel on steel.

Figure 3:
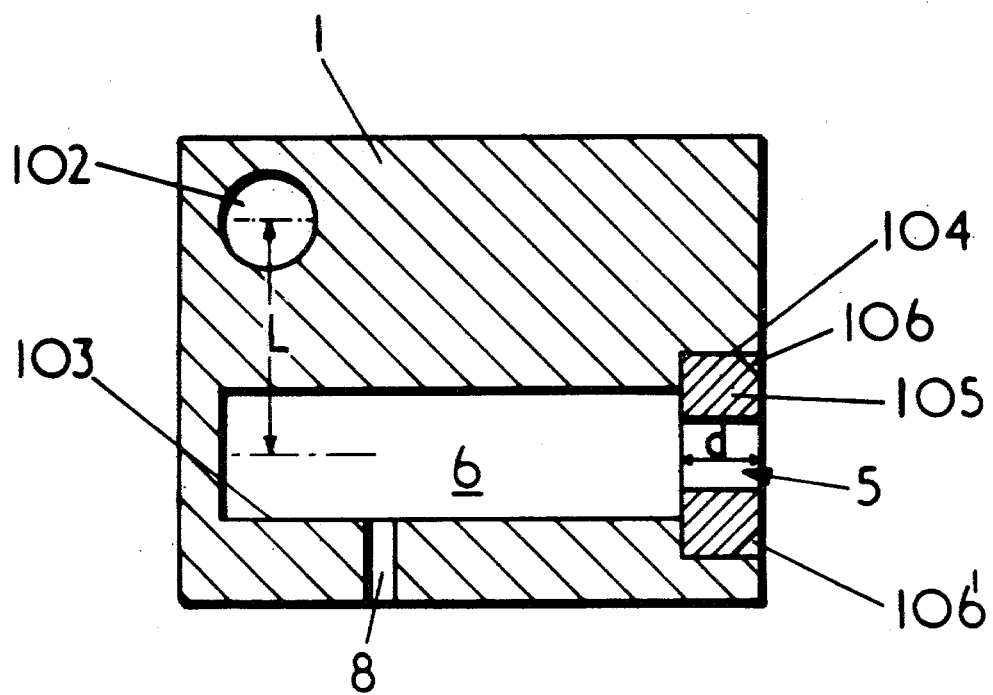
FIG. 3 shows a side sectional view of a second arrangement of a detail of FIG. 1.

A second embodiment of the housing 1 is shown in detail in FIG. 3, to which reference is now also made. The housing 1 is made from a rectangular block of mild steel in the following manner, using a suitable machine tool. A cylindrical hole 102 is made with its axis parallel to the shortest dimension of the block in one corner thereof. A cylindrical well 103 is made in the lower half of the block, as viewed in FIG. 3, with its axis parallel to the longest dimension thereof and having its blind end below the hole 102. A second cylindrical well 104 having a diameter greater than the diameter of the first well 103, is made in the block. The second well 104 is co-axial with the first well 103, and much shorter than the first well 103. A hardened steel ring 105 having an internal diameter less than the diameter of the first well 103 is fitted into the second well 104 and cleated over using chamfer 106. The housing 1 is thus also provided with a bore having a first portion 5 and a second portion 6. A drilling 8 having a smaller diameter than that of the second hole 3 is let into the bore. The bore is filled with grease which, in use, may be forced into or out of the bore through the drilling 8. The first portion 5 formed by the ring 105 has a length d, and the perpendicular distance between the axis of the hole 102 and the axis of the first well 103 is L. In this embodiment the ratio of the length d to the distance L is also 0.18, which is less than the co-efficient of friction of steel on steel.

Referring again to FIG. 1, a cylindrical rod 26 having a diameter marginally smaller than the diameter of the second hole 3 or the internal diameter of the ring 105 enters the housing 1 through the open end of the bore. The rod 26 is slidably connected at its end remote from the housing 1 to the plate 17. Adjustable nuts 27 and 28 screwed onto the slidably connected end of the rod 26 are used to vary the amount of movement of the rod 26 relative to the plate 17. This gives a 'lost motion' character to the arrangement.

The two brake shoe assemblies 11 and 12 are interconnected by an operating mechanism 32 comprising a piston and cylinder arrangement 33 and a connector device 34 connected by an elongate assembly 35. The connector device 34, whose purpose is to ensure that the effective length of the operating mechanism 32 may be reduced to take account of the wear of the brake pads 13 and 14, is described fully in our British Pat. No. 1,342,002, to which reference is now made and from which details of the connector device 34 may be obtained.

The piston and cylinder arrangement 33 comprises a piston rod 50 which is slidably engaged within a bore formed in one end of the piston and cylinder arrangement 33, the said one end having a spigot 51 which is connected to the shoe assembly 12. A coil spring (not shown) acts on the piston (not shown) to urge the piston rod 50 into the cylinder. The piston rod 50 is moved against the action of the spring by a fluid, for instance compressed air. The fluid supply is not shown but may be supplied from a locomotive used to move a series of vehicles which include braking devices as described herein.

A plate 38 is secured to the elongated assembly 35 to prevent rotation thereof.

The braking device is operated in the following way. When no fluid is being supplied to the piston and cylinder arrangement 33, the piston rod 50 is forced into the piston and cylinder arrangement 33 by the coil spring. When fluid is being supplied to the piston and cylinder arrangement 33 the braking device adopts the conformation shown in FIG. 1 in which the brake pads 13 and 14 are not in contact with the rim 15 of the wheel 15′, and in which there is no braking action. To apply the brakes the pressure supply is curtailed and as this happens the action of the spring causes the brake assemblies 11 and 12 to pivot inwardly about pins 19 to bring the brake pads 13 and 14 into contact with the rim 15 of the wheel 15′. As the brake shoe assemblies pivot inwardly a force is exerted on the rods 26 causing them to move inwardly also. At first the rods 26 will slide through the plate 17, until the adjusting nuts 27 abut the plate 17, thus taking up the 'lost motion' in the system. At this stage, using the system shown in FIG. 1, no further movement of the brake assemblies 11 and 12 will occur because the pads 13 and 14 will be abutting the rim 15 of wheel 15′. However, if the pads 13 and 14 are worn the movement of the brake shoe assemblies 11 and 12 will continue until the pads 13 and 14 do abut the rim 15 of the wheel 15′. In this case the housings 1 will move towards the wheel 15′ while the rods 26 remain stationary relative to the wheel 15′. When the brake is released by applying the pressure fluid, the brake assemblies 11 and 12 move away from the wheel 15′ and the rods 26 slide through the plate 17. As soon as the nuts 28 abut the plate 17 the movement of the brake shoe assemblies 11 and 12 is stopped by the action of the non-return device.

The action of the non-return device shown in FIG. 2 is as follows. While there is no movement of the brake assemblies, due to gravity the housing 1 on the right has a tendency to rotate in a clockwise direction and the housing 1 on the left has a tendency to rotate in an anticlockwise direction, as shown in FIG. 1, about bolts 22. This causes the rod 26 to be located with its longitudinal axis no longer parallel to the axis of the bore, and therefore is in jamming engagement with the first portion 5 of the bore. While the brake is applied and after the 'lost motion' has been taken up, i.e. when the nuts 27 are abutting the plate 17, a torque is applied to the housings 1 by the rods 26. This torque is large enough to overcome the effect of gravity on the housings 1 and they therefore have a tendency to rotate in the opposite direction to that previously stated in this paragraph, causing the rods 26 to abut the continuous top surface (as shown in FIG. 2) of the bore. The longitudinal axes of the rods 26 and bores are now parallel and therefore the rods 26 may slide freely within the housings 1. As the brakes are applied an increasing proportion of the rods 26 will be drawn out of the housings 20, and this process will continue until the brake pads 13 and 14 abut the rim 15 of the wheel 15′. As soon as the brake is released the brake assemblies 11 and 12 move away from the wheel 15′ and a second torque acting in the opposite direction to the first torque is applied to the housing 1. The second torque acts in concert with the effect of gravity and the rods 26 therefore become jammed in the housings 1. Thus as soon as the nuts 28 abut the plate 17 no further movement of the brake assemblies 11 and 12 is possible.

The device as shown in FIG. 3 operates in a similar way as the device shown in FIG. 2, except that the rod 26 never abuts the walls of the first well 103. In this case the relative movement of the rod 26 away from the housing 1 causes the rod 26 to be flush with the upper inner surface of the ring 105, thus enabling it to slide therealong. Thus the housings 1 and rods 26 comprise non-return devices according to the invention which allow, in conjunction with the lost motion means, the brake assemblies 11 and 12 move freely towards the wheel 15′, but which constrain the movement of the brake assemblies 11 and 12 in the opposite direction, to the amount set by the lost motion means. This means that the brake pads 13 and 14, no matter how worn they are, remain at a constant distance from the rim 15 of the wheel 15′ when the brake is not applied.

The non-return devices may be easily readjusted when the pads 13 and 14 are replaced. All that need be done is for an operator to prevent the housings 1 from pivoting under the effect of gravity. The rods 26 may then be slid back into the housings 1.

The present invention therefore provides a simple non-return device which is robust and easily adjustable. It is therefore suitable for use in locations in which maintenance is not generally available.

I claim:

1. A non-return device consisting essentially of:
   a housing having a bore therein, said bore having a constant cross-sectional area smooth-walled first section, a constant cross-sectional area smooth-walled second section adjacent said first section and a step discontinuity defining a boundary between said first and second adjacent sections, said second section having a cross-sectional area larger than that of said first section and said first section having pointed rod engaging edges at the terminating ends thereof, said housing being mounted on a pivot which is above and perpendicular to said bore and is asymmetrically disposed with respect to the length of said bore, and a smooth rod passing through said first and second bore sections and having a cross-sectional shape the same as but a cross-sectional area marginally smaller than that of said first bore section, said rod engaging with and jamming against said rod engaging edges of said first bore section upon relative movement between said rod and housing in one direction, caused solely by the action of gravity rotating the housing about the pivot, and moving freely in said bore upon relative movement between said rod and housing in an opposite direction caused by said housing rotating about said pivot against the action of gravity such that relative longitudinal movement between said rod and said housing only occurs when said housing is pivoted against the action of gravity in said opposite direction.

2. A non-return device according to claim 1, wherein the bore has, on one side, a wall which extends the entire length of said bore and, on an opposite side, a wall which is interrupted by said step.

3. A non-return device according to claim 1, wherein said bore is asymmetrically stepped around a portion of its perimeter at a distance from one end of the bore.

4. A non-return device according to claim 1, wherein said bore is symmetrically stepped around its entire perimeter at a distance from one end of said bore.

5. A non-return device according to claim 1, wherein the axis of said pivot is at the center of a mounting hole formed in said housing.

6. A non-return device according to claim 1, wherein the axis of said pivot is perpendicular to the longitudinal axis of the first section of the bore.

* * * * *